(12) United States Patent
Xu et al.

(10) Patent No.: US 7,746,612 B2
(45) Date of Patent: Jun. 29, 2010

(54) OUTPUT VOLTAGE INDEPENDENT OVERVOLTAGE PROTECTION

(75) Inventors: Jingwei Xu, Shanghai (CN); Jian Wang, Plano, TX (US); Jianbo Guo, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 76 days.

(21) Appl. No.: 12/266,156

(22) Filed: Nov. 6, 2008

(65) Prior Publication Data

US 2009/0116159 A1 May 7, 2009

Related U.S. Application Data

(63) Continuation of application No. PCT/CN2007/003155, filed on Nov. 7, 2007.

(51) Int. Cl.
*H02H 9/00* (2006.01)
(52) U.S. Cl. ...................................................... 361/56
(58) Field of Classification Search .................. 361/56
See application file for complete search history.

(56) References Cited

U.S. PATENT DOCUMENTS

| 4,129,788 A * | 12/1978 | Chavannes ................. 307/11 |
| 6,657,841 B1 * | 12/2003 | Melchert et al. ............ 361/100 |
| 6,768,339 B2 * | 7/2004 | Von Thun et al. ............. 326/81 |

FOREIGN PATENT DOCUMENTS

| JP | 2004166391 | 6/2004 |
| JP | 2005237122 | 9/2005 |
| JP | 2006211854 | 8/2006 |

\* cited by examiner

*Primary Examiner*—Stephen W Jackson
(74) *Attorney, Agent, or Firm*—John J. Patti; Wade J. Brady, III; Frederick J. Telecky, Jr.

(57) ABSTRACT

One embodiment of the invention includes a power regulation system. The system comprises a power regulator configured to periodically generate a switch signal that regulates a current flow through an inductor to set a magnitude of an output voltage. The system further comprises an overvoltage protection circuit configured to monitor a peak voltage magnitude of the switch signal and to generate an overvoltage indication signal in response to the peak voltage magnitude of the switch signal exceeding a predetermined limit.

20 Claims, 2 Drawing Sheets

OUTPUT VOLTAGE INDEPENDENT OVERVOLTAGE PROTECTION

CROSS-REFERENCE TO RELATED APPLICATIONS

This application is a continuation of, and claims the benefit of domestic priority from, prior filed international application PCT/CN2007/003155, filed 7 Nov. 2007, which designated the United States. This application also claims a right of foreign priority from the same international application PCT/CN2007/003155, filed 7 Nov. 2007, which also designated at least one country other than the United States. The entirety of that international application is incorporated herein by reference.

TECHNICAL FIELD

This invention relates to electronic circuits, and more specifically to output voltage independent overvoltage protection.

BACKGROUND

Linear and switch-mode voltage regulators constitute fundamental building blocks of today's power management integrated circuits (ICs). One such type of regulator is known as a switching regulator or switching power supply, which controls the flow of power to a load by controlling the on and off duty-cycle of one or more power switches coupled to the load. As an example, a switching regulator can reside in an IC, such that external feedback resistors and an external inductive power source are coupled to the switching regulator to provide a regulated voltage potential at the output of the inductor.

It is typically important to protect the power regulator, as well as associated external circuitry such as the circuitry to which the power regulator provides power, from damage resulting from excessive current. As a result, a power regulation system may include overvoltage protection. As an example, overvoltage protection circuitry may monitor the output voltage of the power regulation system and provide a signal indicating the overvoltage condition. However, monitoring the output voltage of the power regulation system can result in power loss of the power regulation system, as the overvoltage protection circuitry draws power from output voltage of the power regulation system. In addition, such an overvoltage protection system may require one or more dedicated pins on the IC in which the power regulation system resides, as the output voltage may not be provided directly from the IC. Furthermore, by providing a pin on the IC that corresponds to the output voltage, a large electrostatic discharge structure may be necessary to prevent damage to the power regulation system resulting from a high magnitude of the output voltage that is within an acceptable range of output voltages.

SUMMARY

One embodiment of the invention includes a power regulation system. The system comprises a power regulator configured to periodically generate a switch signal that regulates a current flow through an inductor to set a magnitude of an output voltage. The system further comprises an overvoltage protection circuit configured to monitor a peak voltage magnitude of the switch signal and to generate an overvoltage indication signal in response to the peak voltage magnitude of the switch signal exceeding a predetermined limit.

Another embodiment of the invention includes a method for providing overvoltage protection for a power regulation system. The method comprises periodically generating a switch signal and regulating a current flow through an inductor based on the switch signal to set a magnitude of an output voltage. The method also comprises monitoring a peak voltage magnitude of the switch signal, and generating an overvoltage indication signal in response to the peak voltage magnitude of the switch signal exceeding a predetermined limit.

Another embodiment of the invention includes a power regulation system. The system comprises means for periodically generating a switch signal that regulates a current flow through an inductor, and means for setting a magnitude of an output voltage based on the current flow through the inductor. The system also comprises means for monitoring a peak voltage magnitude of the switch signal, and means for generating an overvoltage indication signal in response to the peak voltage magnitude of the switch signal exceeding a predetermined limit.

DETAILED DESCRIPTION

The invention relates to electronic circuits, and more specifically to output voltage independent overvoltage protection. A power regulator periodically generates a switch signal that is used to regulate current flow through a load inductor. As an example, the switch signal controls a power switch that activates to divert the current through the inductor from the output load to ground, thus regulating the output voltage. The switch signal is provided to an overvoltage protection circuit that is configured to sample the switch signal voltage. Specifically, the overvoltage protection circuit generates a pulse signal based on a rising-edge of the switch signal. The pulse signal is delayed to generate one or more delay pulses that activate a respective one or more sample and hold switches. As an example, a first switch may be activated to set an intermediate voltage having a magnitude that is associated with a maximum voltage of the switch signal, and a second switch may be subsequently activated to sample the intermediate voltage onto a capacitor. The sampled voltage can thus be compared with a predetermined reference voltage having a magnitude that is proportional to an overvoltage limit. Upon the intermediate voltage being greater than the reference voltage, the overvoltage protection circuit can generate an overvoltage indication signal.

Figure 1:
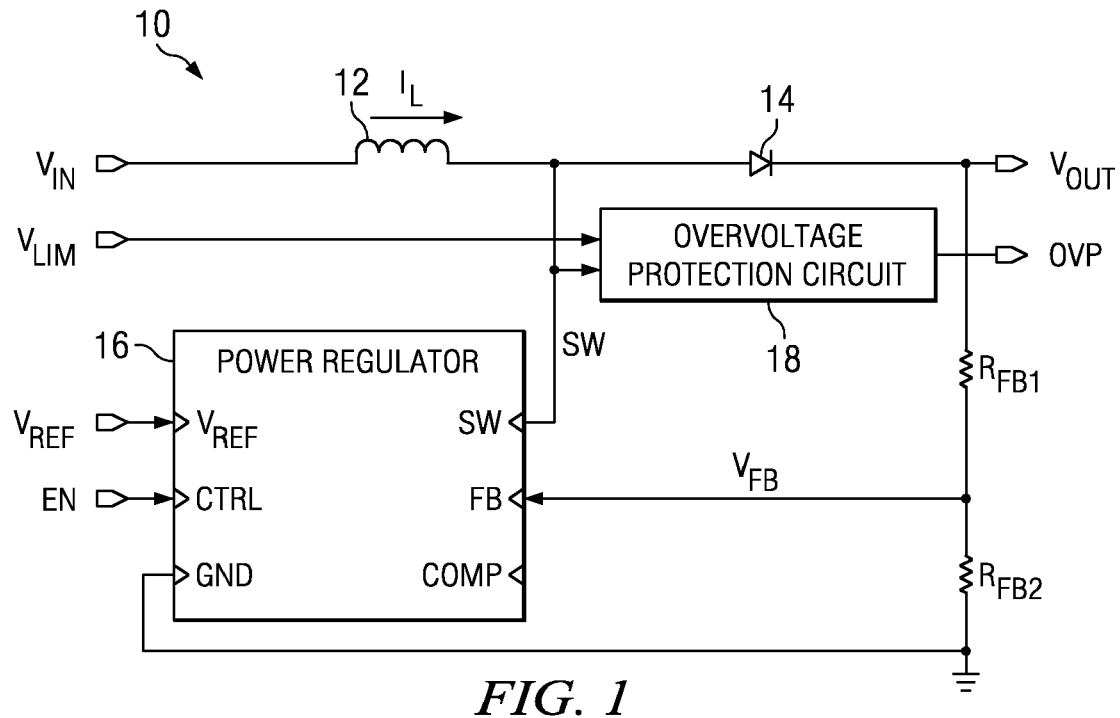
FIG. 1 illustrates an example of a power regulation system in accordance with an aspect of the invention.

FIG. 1 illustrates an example of a power regulation system 10 in accordance with an aspect of the invention. The power regulation system 10 can be included in any of a variety of electronic devices, such as a wireless communication device and/or a portable computing device. In the example of FIG. 1, the power regulation system 10 is demonstrated as a boost regulator, such that for a given input voltage $V_{IN}$, the power regulation system 10 is configured to provide a higher magnitude of an output voltage $V_{OUT}$. The input voltage $V_{IN}$ is provided to a load inductor 12 that conducts a current $I_L$. The current $I_L$ flows through an output diode 14 and sets the output voltage $V_{OUT}$.

The power regulation system 10 includes a power regulator 16. The power regulator 16 can be configured as an integrated circuit (IC), such that the load inductor 12 and the output diode 14 are configured external to the power regulator 16. The power regulator 16 is configured to regulate the magnitude of the output voltage $V_{OUT}$, such as based on a reference voltage $V_{REF}$ and a feedback voltage $V_{FB}$ that are each provided to respective inputs of the power regulator 16. In the example of FIG. 1, the feedback voltage $V_{FB}$ is demonstrated as a voltage-divided version of the output voltage $V_{OUT}$ via feedback resistors $R_{FB1}$ and $R_{FB2}$, such that the feedback voltage $V_{FB}$ has a magnitude that is proportional to the output voltage $V_{OUT}$. The reference voltage $V_{REF}$ can be a predetermined voltage corresponding to a desired magnitude of the output voltage $V_{OUT}$. As an example, although the reference voltage $V_{REF}$ can be a separately provided voltage, the power regulator 16 can instead include internal circuitry configured to set the reference voltage $V_{REF}$ based on the input voltage $V_{IN}$ being provided as an input to the power regulator 16.

The power regulator 16 also includes a control input CTRL that is configured to receive an enable signal EN. The enable signal EN, for example, can be a signal that is set logic-high to activate the power regulator 16, such that the power regulator 16 can be enabled by other circuitry to provide the output voltage $V_{OUT}$. The power regulator 16 also includes a compensation input COMP. The compensation input COMP can be implemented to provide slope compensation, such as to provide a soft-start voltage to the power regulator 16. In the example of FIG. 1, the compensation input COMP is demonstrated as unconnected. However, it is to be understood that the compensation input COMP can be provided with any of a variety of input components to provide the slope compensation, such as a capacitor or a capacitor/resistor combination.

To regulate the output voltage $V_{OUT}$, the power regulator 16 includes an output SW that provides a switch signal SW. The switch signal SW can be generated based on a comparison of an error voltage, such as associated with a relative magnitude of the reference voltage $V_{REF}$ and the feedback voltage $V_{FB}$, and a ramp signal. For example, the comparison of the ramp signal and the error voltage can result in the periodic activation of a power switch within the power regulator, such that the switch signal SW is activated to limit the current $I_L$ according to a repeated duty-cycle defined by the comparison. As an example, the power switch can be configured, upon activation, to periodically couple the anode of the output diode 14 to ground, thus drawing the inductor current $I_L$ from the output of the power regulation system 10 to ground. As a result, the output voltage $V_{OUT}$ can be regulated based on the activation of the switch signal SW to periodically sink the current $I_L$ to ground, as defined by the duty-cycle.

The output voltage $V_{OUT}$ is thus regulated at a predefined magnitude based on a variety of factors, including the reference voltage $V_{REF}$, the feedback voltage $V_{FB}$, and the switch signal SW. However, it may be important to monitor the magnitude of the output voltage $V_{OUT}$, such that the occurrence of an overvoltage condition that could lead to excessive output current, and thus damage to associated circuit components, can be promptly detected. Therefore, the power regulation system 10 includes an overvoltage protection circuit 18. The overvoltage protection circuit 18 can be configured as a device that is separate from the power regulator 16, or could be integrated with the power regulator 16, such that they both occupy an associated IC.

The overvoltage protection circuit 18 is configured to monitor the peak voltage magnitude of the switch signal SW, instead of monitoring the magnitude of the output voltage $V_{OUT}$. Since the voltage of the switch signal SW has a peak magnitude that is approximately equal to the output voltage $V_{OUT}$ plus a voltage across the output diode 14, the peak magnitude of the switch signal SW can be associated with the output voltage $V_{OUT}$. As a result, the overvoltage protection circuit 18 can still detect an overvoltage condition associated with the output voltage $V_{OUT}$ despite monitoring the peak magnitude of the switch signal SW. In addition, as described above, the switch signal SW pulls the current $I_L$ to ground periodically based on the duty-cycle of the power regulator 16. Therefore, the overvoltage protection circuit 18 wastes none of the current that is intended for a load to which the output voltage $V_{OUT}$ is provided because the current $I_L$ that is pulled to ground by the switch signal SW is not intended to be provided to the load. As a result, the overvoltage protection circuit 18 conserves power of the power regulation system 10. Furthermore, monitoring the switch signal SW, as opposed to the output voltage $V_{OUT}$ directly, is more efficient as it saves an I/O pin of the associated IC and obviates the potential need for an expensive and bulky electrostatic discharge (ESD) device for the output voltage $V_{OUT}$.

Because the switch signal SW only conducts current at specific times (e.g., during an on-time defined by the duty-cycle), the overvoltage protection circuit 18 can include an edge-detector (not shown) that detects a rising-edge of the switch signal SW, such that the overvoltage protection circuit 18 can sample the peak magnitude of the switch signal SW at the appropriate times. As an example, the overvoltage protection circuit 18 can implement switches that are sequentially responsive to the detected rising-edge to sample the peak magnitude of the switch signal SW. The sampled peak magnitude of the switch signal SW can thus be compared with a predetermined voltage limit $V_{LIM}$ that is associated with a voltage limit of the maximum voltage of the switch signal SW that corresponds to an overvoltage condition. In response to the sampled peak magnitude of the switch signal SW being greater than the voltage limit $V_{LIM}$, the overvoltage protection circuit 18 provides an output signal OVP that is indicative of an overvoltage condition. The output signal OVP can be provided to additional circuitry, such as one or more load devices for which the output voltage $V_{OUT}$ is intended, or can be provided to control the power regulator 16. As an example, the output signal OVP can be logically associated with the enable signal EN, such that the output signal OVP, upon being activated, can shutdown the power regulator 16 in response to the overvoltage condition.

It is to be understood that the power regulation system 10 is not intended to be limited to the example of FIG. 1. For example, although the power regulation system 10 is demonstrated as a boost regulator, it is to be understood that monitoring the switch signal SW to determine the occurrence of an overvoltage condition, as described above, can be implemented in any of a variety of power regulator types, such as a buck converter and/or a buck/boost converter. In addition, the power regulation system 10 is demonstrated simplistically, in that additional components of a boost regulator that are not pertinent to the invention may have been omitted in the description of the example of FIG. 1. Therefore, the power regulation system 10 in the example of FIG. 1 can be configured in any of a variety of ways.

Figure 2:
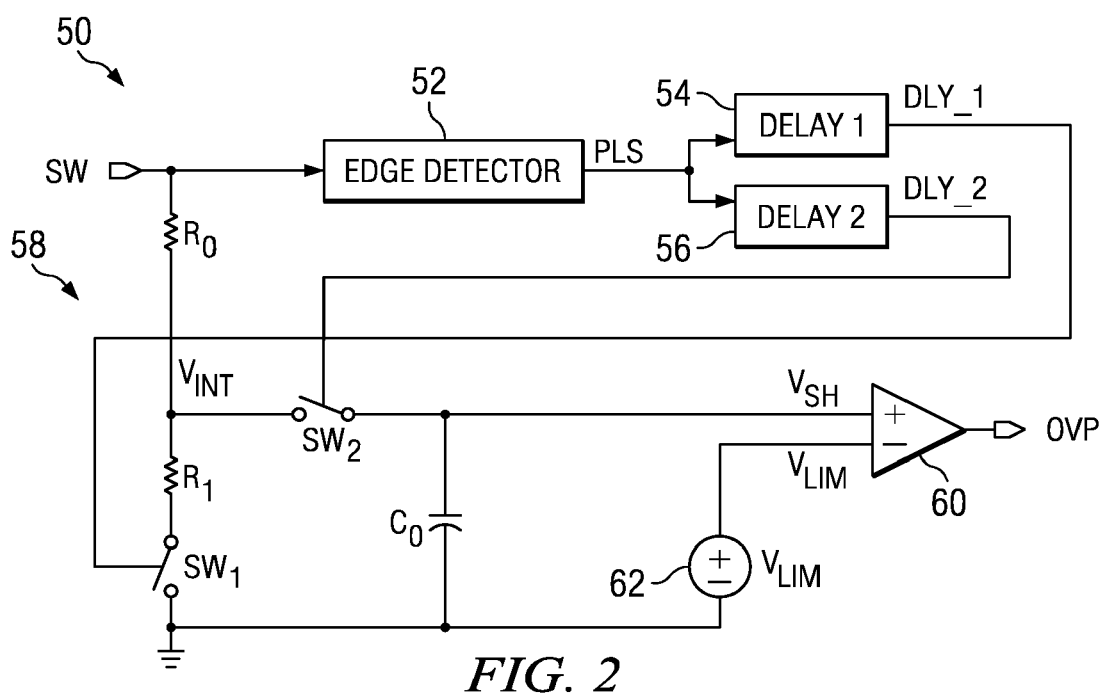
FIG. 2 illustrates an example of an overvoltage protection circuit in accordance with an aspect of the invention.

FIG. 2 illustrates an example of an overvoltage protection circuit 50 in accordance with an aspect of the invention. The overvoltage protection circuit 50 can be configured substantially similar to the overvoltage protection circuit 18 in the example of FIG. 1. As such, reference is to be made to the example of FIG. 1 in the following description of the example of FIG. 2.

The overvoltage protection circuit 50 receives the switch signal SW as an input. The switch signal SW is provided to an edge-detector 52 that is configured to detect a rising-edge of the switch signal SW. As an example, the edge-detector 52 can be configured to detect a positive slope of the switch signal SW, and thus to provide a pulse signal PLS in response to the detected rising-edge. The pulse signal PLS can thus be a logic signal that is logic-high during the positive slope, and thus rising-edge, of the switch signal SW. It is to be understood that the edge-detector 52 can be configured as any of a variety of circuits operative to provide a logic signal corresponding to a rising-edge of the switch signal SW.

The pulse signal PLS is provided to a first delay circuit 54 and a second delay circuit 56. Each of the first and second delay circuits 54 and 56 are configured to delay the pulse signal PLS by at least one of the rising-edge and the duration. As an example, the first delay circuit 54 can be configured to delay the pulse signal PLS to generate a delay pulse DLY_1. The delay pulse DLY_1 can be a version of the pulse signal PLS that has a delayed rising-edge and has an extended duration relative to the pulse signal PLS. Likewise, the second delay circuit 56 can be configured to delay the pulse signal PLS to generate a delay pulse DLY_2, with the delay pulse DLY_2 being a version of the pulse signal PLS that also has a delayed rising-edge and has an extended duration relative to the pulse signal PLS. The delay pulse DLY_1 and DLY_2 can be delayed and/or extended separately and independently from each other, as described below.

The delay pulse DLY_1 and the delay pulse DLY_2 are configured to control a first switch $SW_1$ and a second switch $SW_2$, respectively. The switches $SW_1$ and $SW_2$ can be configured as transistors, such as field-effect transistors (FETs). Therefore, upon the delay pulse DLY_1 being asserted, the switch $SW_1$ is closed, and upon the delay pulse DLY_2 being asserted, the switch $SW_2$ is closed. The first switch $SW_1$ and the second switch $SW_2$ are thus configured to control sampling and holding of the peak magnitude of the switch signal SW based on their relative activation times, as dictated by the first delay pulse DLY_1 and the second delay pulse DLY_2, respectively.

In addition to being provided to the edge-detector 52, the switch signal SW is also provided to a current path 58. Specifically, upon the first delay pulse DLY_1 being asserted, the switch $SW_1$ is closed to allow current to flow through the current path 58 to ground. The current path 58 includes a resistor $R_0$ and a resistor $R_1$ that form a voltage-divider. Therefore, the resistors $R_0$ and $R_1$ generate an intermediate voltage $V_{INT}$ that has a magnitude that is proportional to the magnitude of the maximum voltage of the switch signal SW. Thus, upon the second delay pulse DLY_2 being asserted, the switch $SW_2$ is closed to sample the intermediate voltage $V_{INT}$ onto a capacitor $C_0$ as a sample and hold voltage $V_{SH}$. The first delay pulse DLY_1 can have a rising-edge that occurs in time previous to a rising-edge of the second delay pulse DLY_2. As a result, the intermediate voltage $V_{INT}$ can have a substantially stable value prior to being sampled onto the capacitor $C_0$. Specifically, the proportion of the switch signal SW that is provided as the intermediate voltage $V_{INT}$ can be based on the resistance value of the resistors $R_0$ and $R_1$ upon the closure of the first switch $SW_1$. It is to be understood that the sample and hold voltage $V_{SH}$ and the intermediate voltage $V_{INT}$ differ by virtue of the second switch $SW_2$, such that they have different magnitudes upon the second switch $SW_2$ being opened.

The overvoltage protection circuit 50 includes a comparator 60. The comparator 60 is configured to compare the sample and hold voltage $V_{SH}$ with the voltage limit $V_{LIM}$. As described above in the example of FIG. 1, the voltage limit $V_{LIM}$ is associated with a voltage limit that can correspond to an overvoltage condition of the maximum voltage of the switch signal SW. As an example, the voltage limit $V_{LIM}$ can have a magnitude that is proportional to the output voltage $V_{OUT}$ plus a voltage across the output diode 14 (e.g., 0.7 volts), with the proportion being approximately equal to the proportion between the magnitude of the intermediate voltage $V_{INT}$ and the maximum voltage of the switch signal SW. The voltage limit $V_{LIM}$ is demonstrated in the example of FIG. 2 as being generated from a voltage source 62. The voltage source 62 can be a part of the overvoltage protection circuit 50, or can be externally provided. Upon the sample and hold voltage $V_{SH}$ being greater than the voltage limit $V_{LIM}$, the comparator 60 provides the output signal OVP that is indicative of the overvoltage condition. As a result, one or more circuit components, such as the power regulator 16 in the example of FIG. 1, can respond appropriately to the received indication of the overvoltage condition.

It is to be understood that the overvoltage protection circuit 50 is not intended to be limited to the example of FIG. 2. As an example, the sampling and holding of the intermediate voltage $V_{INT}$ onto the capacitor $C_0$ can occur in any of a variety of ways, and can be based on a single switch, as opposed to both of the switches $SW_1$ and $SW_2$. In addition, indication of the activation of the switch signal SW, as well as the generation of the control signals for the switches $SW_1$ and $SW_2$, need not be limited to the edge-detector 52 and the respective delay circuits 54 and 56, but can be provided based on other circuit implementations, such as a comparator and one or more transistors activated by the comparator. Furthermore, the overvoltage protection circuit 50 can include additional current limiting devices in the current path 58, such as an active transistor in series with the resistors $R_0$ and $R_1$ that can be configured to clamp or otherwise limit the current flow through the current path 58. Therefore, the overvoltage protection circuit 50 can be configured in any of a variety of ways.

Figure 3:
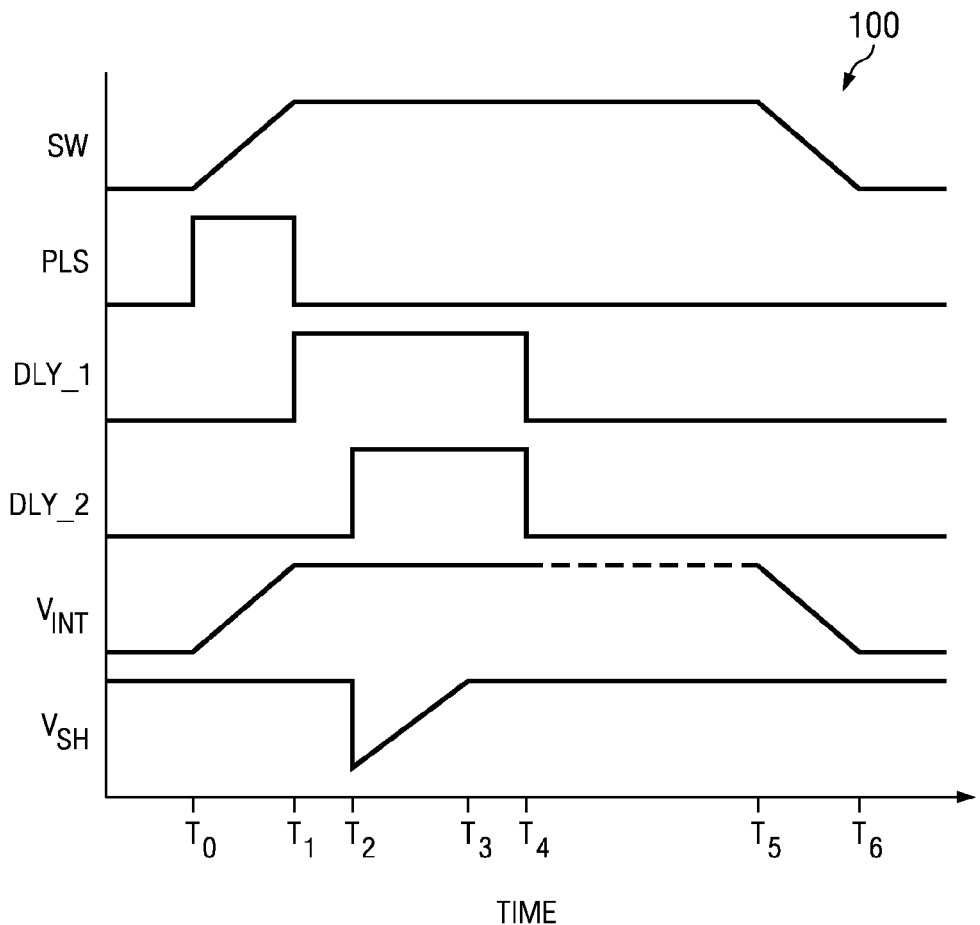
FIG. 3 illustrates an example of a timing diagram in accordance with an aspect of the invention.

FIG. 3 illustrates an example of a timing diagram 100 in accordance with an aspect of the invention. The timing diagram 100 is associated with the overvoltage protection circuit 50 in the example of FIG. 2. Therefore, reference is to be made to the example of FIG. 2 in the following discussion of the example of FIG. 3. In addition, it is to be understood that the timing diagram 100 is demonstrated as an ideal timing diagram, such that inherent delays, variations in magnitude of the illustrated signals relative to each other, and/or noise characteristics are not demonstrated.

The timing diagram 100 includes the switch signal SW, the pulse signal PLS, the delay pulses DLY_1 and DLY_2, the intermediate voltage $V_{INT}$, and the sample and hold voltage $V_{SH}$ as a function of time. At a time $T_0$, the switch signal SW is activated and begins to increase in magnitude. Therefore, the edge-detector 52 generates the pulse signal PLS substantially concurrently, such that the pulse signal PLS switches to a logic-high state at the time T0. In addition, the intermediate voltage $V_{INT}$ begins to increase at the time $T_0$ in response to the activation of the switch signal SW.

As described above in the example of FIG. 2, the pulse signal PLS is provided to both the first and second delay circuits 54 and 56. The first delay circuit 54 thus provides the first delay pulse DLY_1 at a time $T_1$, such that the rising-edge of the first delay pulse DLY_1 is delayed from the pulse signal by an amount of time of $T_1$ minus $T_0$. Therefore, at the time $T_1$, the first delay pulse DLY_1 activates and closes the first switch $SW_1$. Accordingly, the intermediate voltage $V_{INT}$ is set at a magnitude that is proportional to the maximum voltage of the switch signal SW, as defined by the resistance values of the resistors $R_0$ and $R_1$. In addition, because the switch signal SW reaches a substantially constant value at the time $T_1$, the pulse signal PLS is switched to a logic-low state.

Similar to the first delay circuit 54, the second delay circuit 56 provides the second delay pulse DLY_2 at a time $T_2$, such that the rising-edge of the first delay pulse DLY_2 is delayed from the pulse signal by an amount of time of $T_2$ minus $T_0$. Therefore, at the time $T_2$, the second delay pulse DLY_2 activates and closes the second switch $SW_2$. During the time prior to the time $T_2$, the capacitor $C_0$ may have held charge, and thus may have been providing a given sample and hold voltage $V_{SH}$ to the comparator 60. Upon the closure of the switch $SW_2$ at the time $T_2$, the remaining charge on the capacitor $C_0$ may be momentarily discharged, such that the sample and hold voltage momentarily decreases. However, at the time $T_2$, the capacitor $C_0$ begins sampling the intermediate voltage $V_{INT}$. Therefore, the sample and hold voltage $V_{SH}$ begins to increase.

At a time $T_3$, the capacitor $C_0$ is substantially fully charged. Thus, the sample and hold voltage achieves a magnitude that is substantially equal to the intermediate voltage $V_{INT}$. Accordingly, if the sample and hold voltage $V_{SH}$ has not achieved a magnitude greater than the voltage limit $V_{LIM}$, and thus the comparator 60 has not provided the output signal OVP to indicate an overvoltage condition, then the power regulation system 10 remains operational as intended. At a time $T_4$, both the first delay pulse DLY_1 and the second delay pulse DLY_2 are switched to a logic-low state. Therefore, the duration of the first delay pulse DLY_1 is extended by an amount of $(T_4-T_1)$ minus $(T_1-T_0)$, and the second delay pulse DLY_2 is extended by an amount of $(T_4-T_2)$ minus $(T_1-T_0)$. Also at the time $T_4$, the magnitude of the intermediate voltage $V_{INT}$ begins to increase, indicated in the example of FIG. 3 as a dotted line for simplicity, as it is no longer divided by the resistance value of the resistor $R_1$.

At a time $T_5$, the switch signal SW begins to decrease, such as in response to the closure of the power switch that sinks the inductor current $I_L$ to ground. Thus, at the time $T_5$, the intermediate voltage $V_{INT}$ also begins to decrease, until a time $T_6$ at which both the switch signal SW and the intermediate voltage $V_{INT}$ settle to substantially zero. Accordingly, the timing diagram 100 demonstrates that an overvoltage condition can be detected based on monitoring the peak voltage magnitude of the switch signal SW. As such, the overvoltage condition is detected independent of the output voltage $V_{OUT}$.

Figure 4:
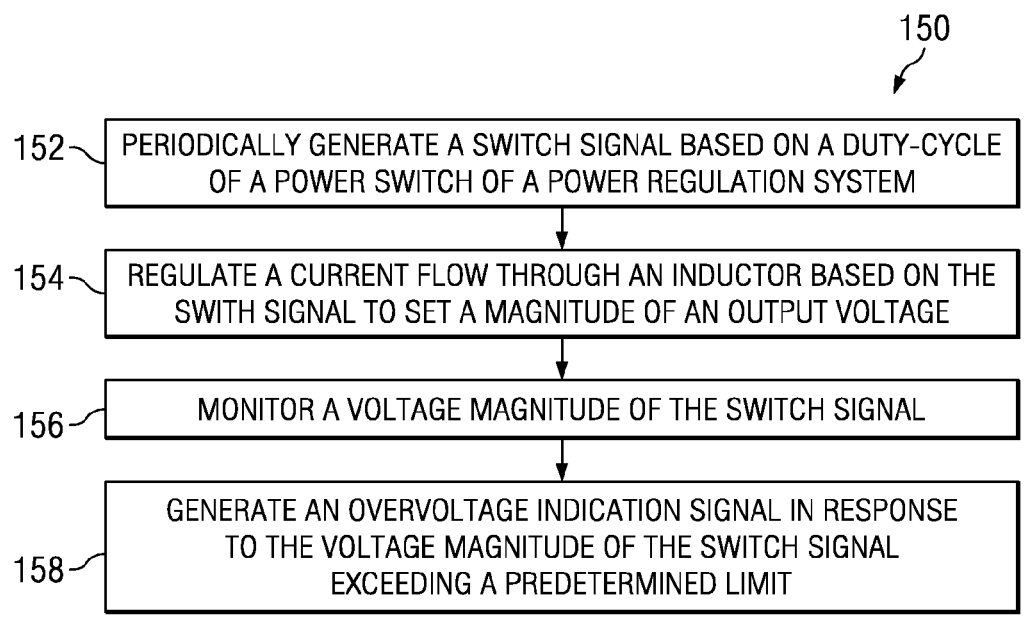
FIG. 4 illustrates an example of a method for providing overvoltage protection for a power regulation system in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 illustrates an example of a method 150 for providing overvoltage protection for a power regulation system in accordance with an aspect of the invention. At 152, a switch signal is periodically generated based on a duty-cycle of a power switch of the power regulation system. The switch signal can be generated from a power regulator in the power regulation system, such as in an IC. As an example, the switch signal can be based on activation of a power switch, such that the duty-cycle is defined by a comparison of an error voltage and a ramp voltage. At 154, a current flow through an inductor is regulated based on the switch signal to set a magnitude of an output voltage. The switch signal can be a current path for the current through the inductor, such that the current through the inductor is sunk to ground in response to the switch signal.

At 156, a peak voltage magnitude of the switch signal is monitored. The monitoring of the peak voltage magnitude of the switch signal can occur based on an edge-detector providing a pulse signal corresponding to a rising-edge of the switch signal. The pulse signal can thus control a sequential activation of switches to sample a peak voltage magnitude of the switch signal onto a capacitor. The monitored peak voltage magnitude can be based on an intermediate voltage that has a magnitude proportional to the peak voltage magnitude of the switch signal. At 158, an overvoltage indication signal is generated in response to the peak voltage magnitude of the switch signal exceeding a predetermined voltage limit. The predetermined voltage limit can be based on a voltage limit that can be proportional to a limit associated with the output voltage. As such, the voltage limit can be proportional to the limit associated with the output voltage by the same proportion as the intermediate voltage is proportional to the switch signal. The overvoltage indication signal can be a signal that is provided to one or more additional circuit devices, such as the power regulator itself to halt operation of the power regulation system 10.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulation system comprising:
   a power regulator configured to periodically generate a switch signal that regulates a current flow through an inductor to set a magnitude of an output voltage; and
   an overvoltage protection circuit configured to monitor a peak voltage magnitude of the switch signal and to generate an overvoltage indication signal in response to the peak voltage magnitude of the switch signal exceeding a predetermined limit.

2. The system of claim 1, wherein the overvoltage protection circuit comprises an edge-detector configured to generate a pulse signal corresponding to a rising-edge of the switch signal, the pulse signal being associated with sampling the peak voltage magnitude of the switch signal.

3. The system of claim 2, wherein the overvoltage protection circuit is further configured to generate at least one delay pulse associated with the pulse signal, the at least one delay pulse controlling a respective at least one sample and hold switch for sampling the peak voltage magnitude of the switch signal.

4. The system of claim 3, wherein the at least one delay pulse comprises a first delay pulse and a second delay pulse, the overvoltage protection circuit further comprising a first delay circuit configured to generate the first delay pulse and a second delay circuit configured to generate the second delay pulse, each of the first delay pulse and the second delay pulse having at least one of a delayed rising-edge relative to the pulse signal and an extended duration relative to the pulse signal.

5. The system of claim 4, wherein the first delay pulse activates a first sample and hold switch configured to set an intermediate voltage having a magnitude that is proportional to the switch signal and the second delay pulse activates a second sample and hold switch configured to sample the intermediate voltage onto a capacitor.

6. The system of claim 3, wherein the at least one sample and hold switch is configured to sample an intermediate voltage onto a capacitor, the intermediate voltage having a magnitude that is proportional to the peak voltage magnitude of the switch signal.

7. The system of claim 6, wherein the overvoltage protection circuit further comprises a comparator configured to output the overvoltage indication signal in response to the sampled intermediate voltage being greater than a voltage limit that is associated with the predetermined limit of the magnitude of the switch signal.

8. The system of claim 1, wherein the overvoltage protection circuit is configured to sample an intermediate voltage having a magnitude that is proportional to the peak voltage magnitude of the switch signal onto a capacitor in response to a rising-edge of the switch signal.

9. The system of claim 8, wherein the overvoltage protection circuit further comprises a comparator configured to output the overvoltage indication signal in response to the sampled intermediate voltage being greater than a voltage limit that is associated with the predetermined limit of the magnitude of the switch signal.

10. A method for providing overvoltage protection for a power regulation system, the method comprising:
periodically generating a switch signal based on a duty-cycle of a power switch of the power regulation system;
regulating a current flow through an inductor based on the switch signal to set a magnitude of an output voltage;
monitoring a peak voltage magnitude of the switch signal; and
generating an overvoltage indication signal in response to the peak voltage magnitude of the switch signal exceeding a predetermined limit.

11. The method of claim 10, wherein monitoring the peak voltage magnitude of the switch signal comprises sampling an intermediate voltage having a magnitude that is proportional to the peak voltage magnitude of the switch signal onto a capacitor in response to a rising-edge of the switch signal.

12. The method of claim 11, further comprising comparing the sampled intermediate voltage with a voltage limit that is associated with the predetermined limit of the peak voltage magnitude of the switch signal.

13. The method of claim 10, further comprising:
generating a pulse signal corresponding to a rising-edge of the switch signal; and
sampling the peak voltage magnitude of the switch signal based on the pulse signal.

14. The method of claim 13, wherein sampling the peak voltage magnitude of the switch signal comprises:
generating at least one delay signal having at least one of a delayed rising-edge relative to the pulse signal and an extended duration relative to the pulse signal;
activating at least one respective switch based on the at least one delay signal; and
charging a capacitor in response to activating the at least one respective switch.

15. The method of claim 14, wherein activating the at least one respective switch comprises:
activating a first switch to set an intermediate voltage having a magnitude that is proportional to the peak voltage magnitude of the switch signal; and
activating a second switch to sample the intermediate voltage onto the capacitor.

16. The method of claim 14, further comprising comparing a voltage across the capacitor with a voltage limit that is associated with the predetermined limit of the peak voltage magnitude of the switch signal.

17. A power regulation system comprising:
means for periodically generating a switch signal that regulates a current flow through an inductor;
means for setting a magnitude of an output voltage based on the current flow through the inductor;
means for monitoring a peak voltage magnitude of the switch signal; and
means for generating an overvoltage indication signal in response to the peak voltage magnitude of the switch signal exceeding a predetermined limit.

18. The system of claim 17, wherein the means for monitoring comprises means for generating a pulse signal corresponding to a rising-edge of the switch signal, the pulse signal being associated with sampling the peak voltage magnitude of the switch signal.

19. The system of claim 18, wherein the means for monitoring further comprises:
means for generating a first delay pulse based on the pulse signal, the first delay pulse being configured to activate a switch that sets a magnitude of an intermediate voltage; and
means for generating a second delay pulse based on the pulse signal, the second delay pulse being configured to sample the intermediate voltage onto a capacitor;
wherein each of the first delay pulse and the second delay pulse have at least one of a delayed rising-edge relative to the pulse signal and an extended duration relative to the pulse signal.

20. The system of claim 19, wherein the means for generating the overvoltage indication signal is further configured to compare the sampled intermediate voltage across the capacitor with a voltage limit that is associated with the predetermined limit of the peak voltage magnitude of the switch signal.

* * * * *